July 7, 1942.   A. R. THOMPSON   2,288,756
FRUIT JUICE EXTRACTING MACHINE
Filed July 30, 1940   6 Sheets-Sheet 1
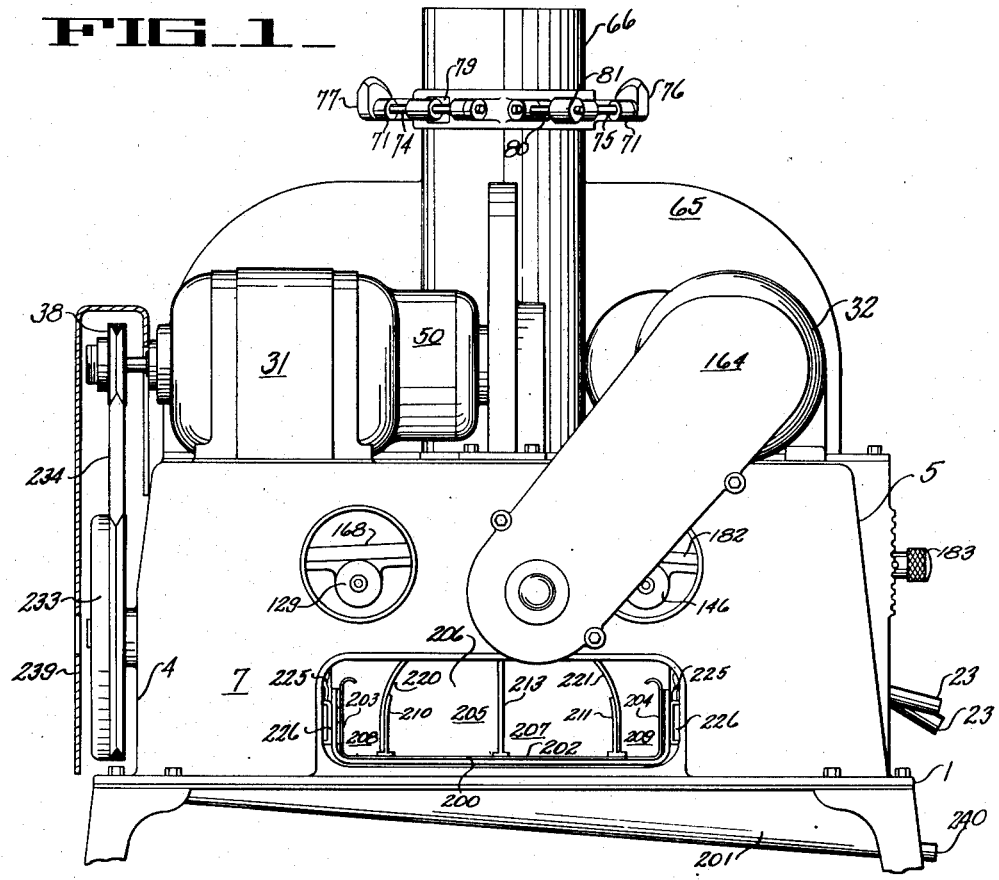
FIG_1_
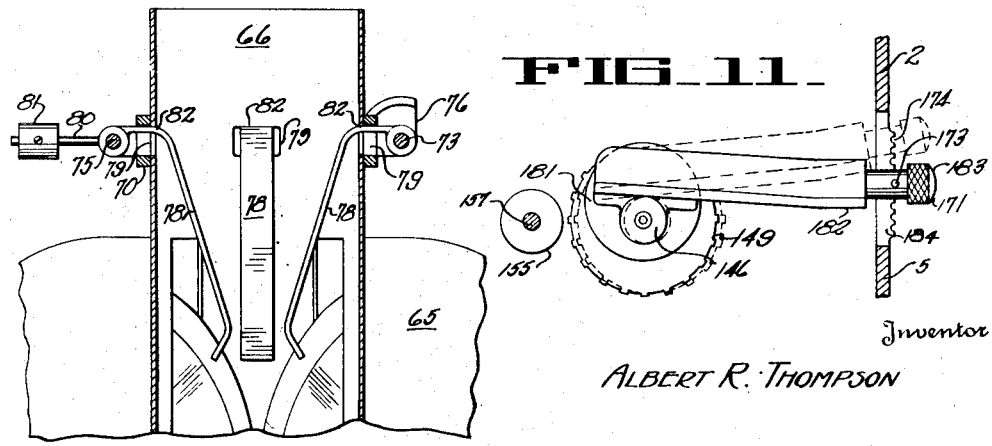
FIG_10_   FIG_11_
Inventor
ALBERT R. THOMPSON
By Philip A. Minnis
Attorney July 7, 1942.    A. R. THOMPSON    2,288,756
FRUIT JUICE EXTRACTING MACHINE
Filed July 30, 1940    6 Sheets-Sheet 2
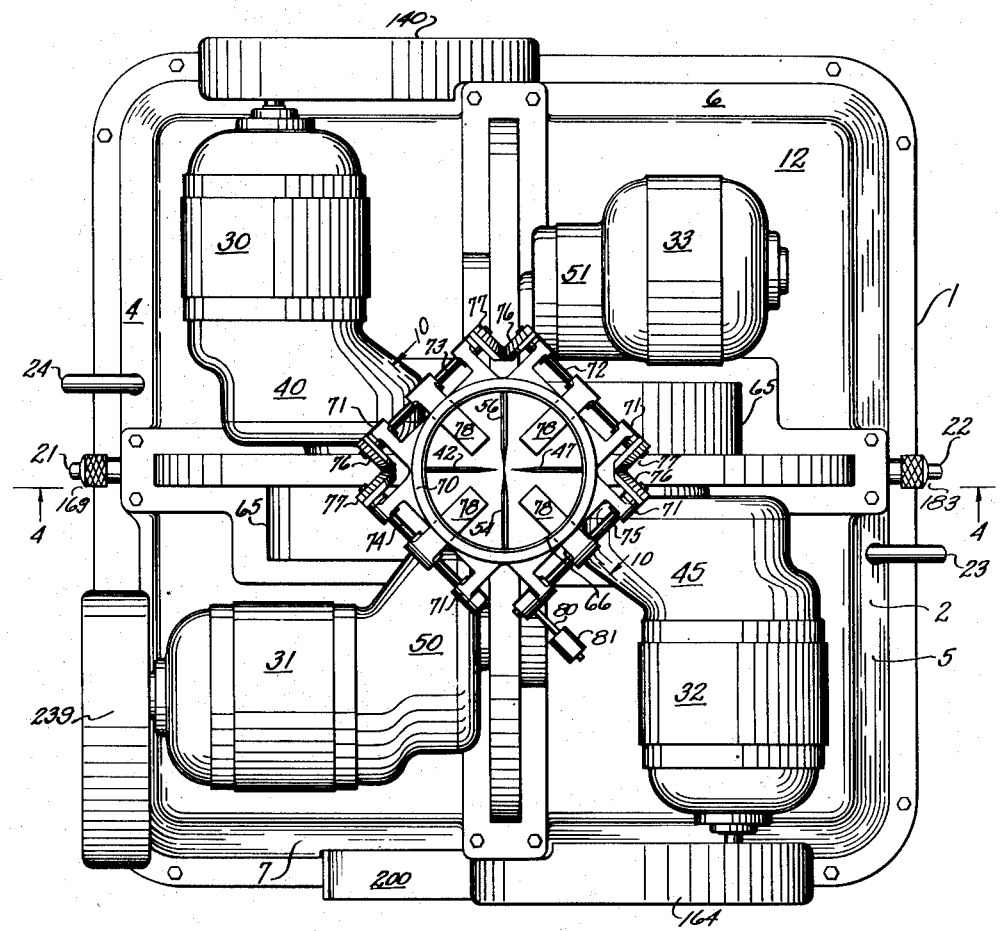
Inventor
ALBERT R. THOMPSON
By Philip G. Minnis
Attorney

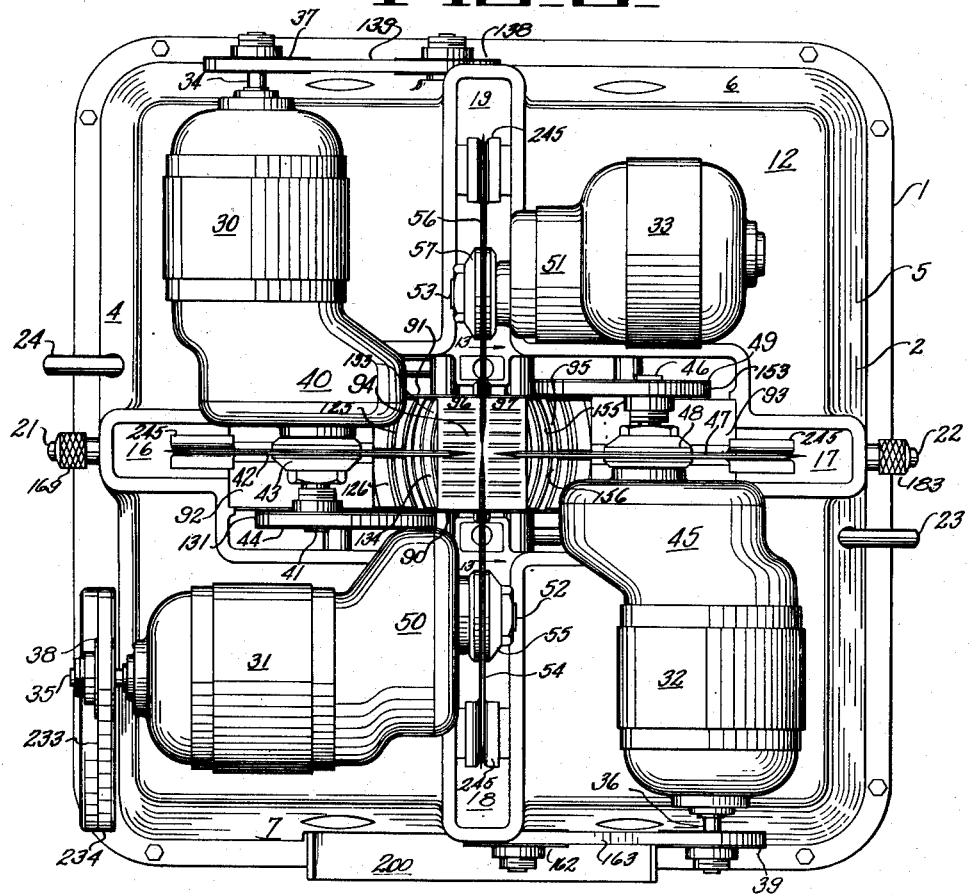

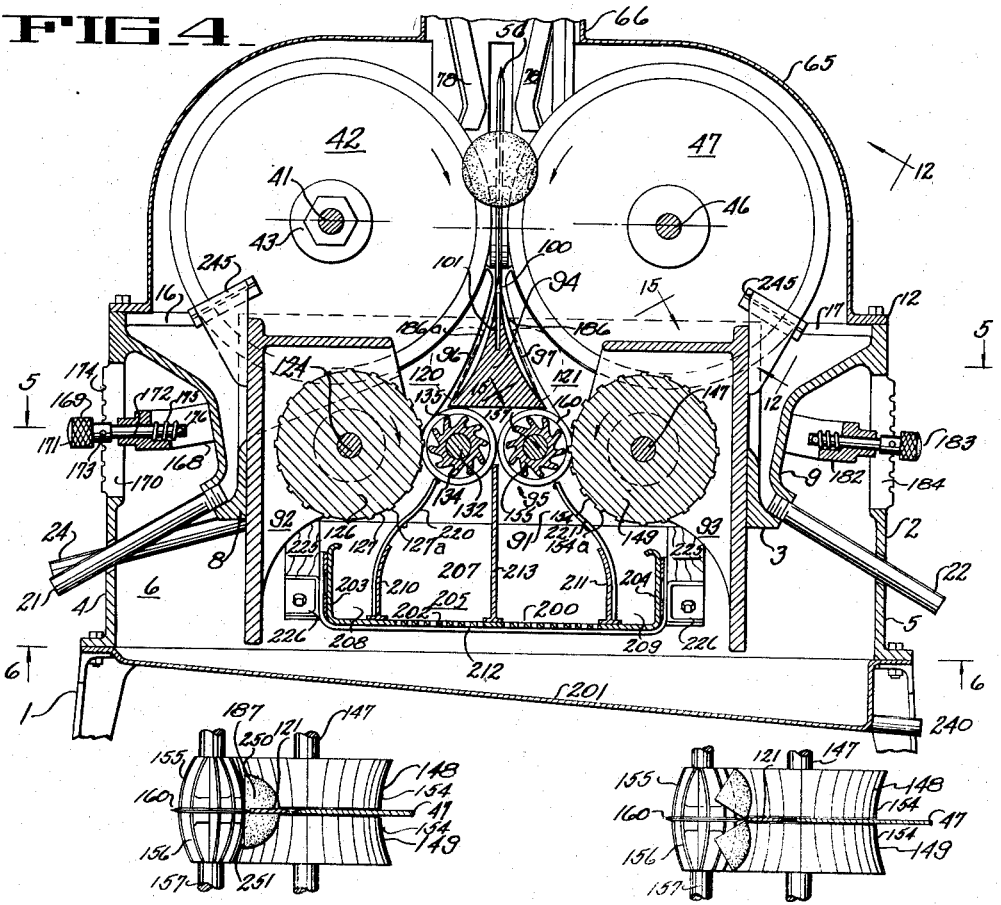

July 7, 1942.  A. R. THOMPSON  2,288,756
FRUIT JUICE EXTRACTING MACHINE
Filed July 30, 1940    6 Sheets-Sheet 5
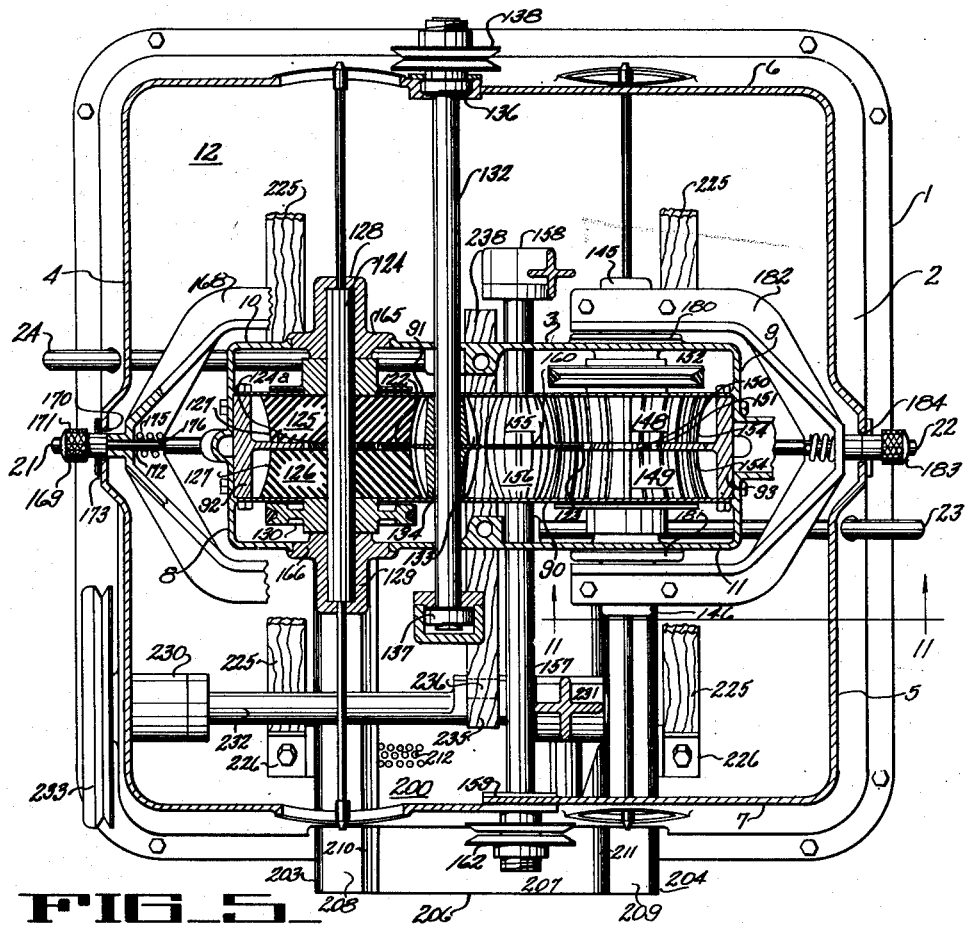
FIG_5_
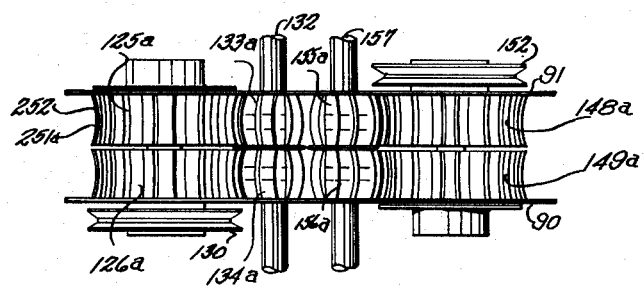
FIG_9_
Inventor
ALBERT R. THOMPSON
By Philip G. Minnis
Attorney

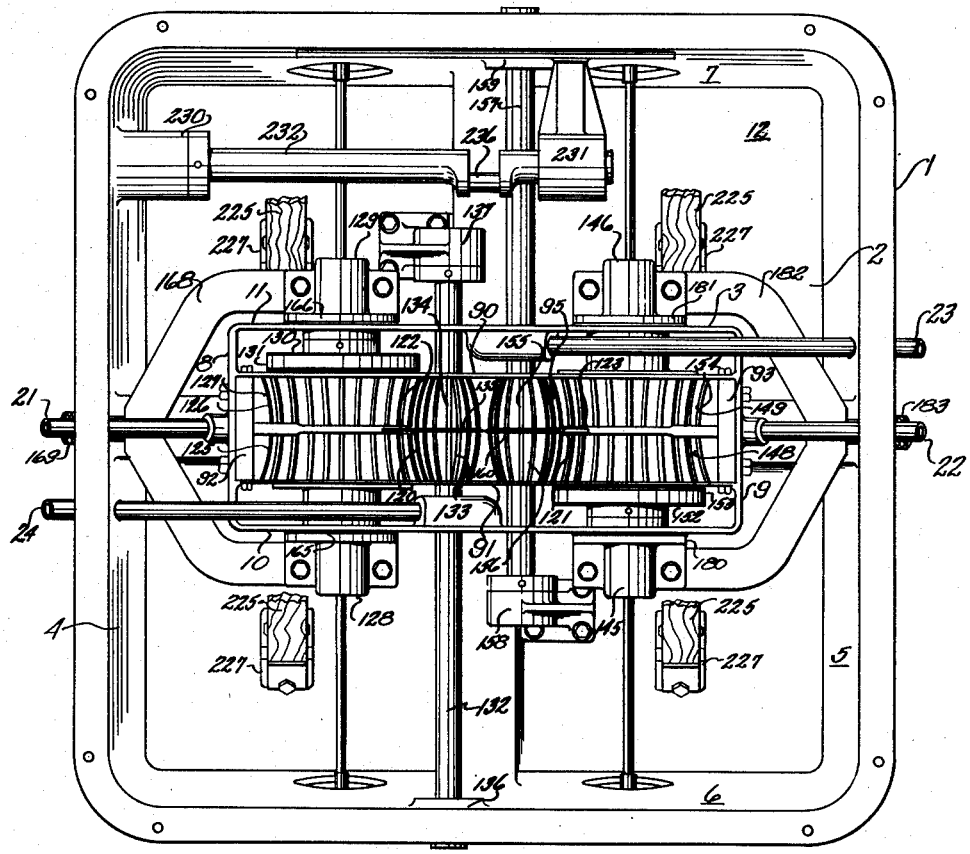

Patented July 7, 1942

2,288,756

UNITED STATES PATENT OFFICE 2,288,756

FRUIT JUICE EXTRACTING MACHINE

Albert R. Thompson, Los Gatos, Calif., assignor to Food Machinery Corporation, San Jose, Calif., a corporation of Delaware Application July 30, 1940, Serial No. 348,504

13 Claims. (Cl. 146—3)

The present invention relates to a machine for extracting the juice and edible pulp from citrus fruits, such as oranges, lemons, grapefruit or the like.

One object of the present invention is to provide a juice extracting machine of simple construction and efficient operation which permits feeding of the fruits thereto in a continuous single file without the necessity of timing the travel of the fruits through the machine to obtain a maximum output thereof.

Another object is to provide a juice extracting machine which comprises means for automatically centering the fruits relative to the cutting mechanism for guiding the cut portions of the fruits into predetermined positions with respect to the juice extracting mechanism for efficient removal of the juice and edible pulp of the fruits.

Another object is to provide a cutting mechanism for cutting the fruits and for automatically centering the same with respect to the cutting mechanism incident to the cutting operation thereof.

Another object is to provide a cutting mechanism for simultaneously cutting the fruits into halves and quarters to facilitate the removal of the juice and edible pulp thereof.

Another object is to provide a cutting mechanism for cutting the fruits into halves and for dividing the halved fruits into quarters without completely separating the same.

Another object of the present invention is to provide a cutting mechanism for cutting the fruits into equal portions irrespective of the size of the fruits.

Another object is to provide a guide mechanism for automatically guiding the completely separated halves of the fruit and the partially divided quarter portions thereof into predetermined positions with respect to the juice extracting mechanism.

Another object is to provide means for collecting the peel oil of the fruits from the cutting mechanism of the machine to prevent comingling of the same with the juice.

Another object is to provide means for adjusting the position of the feed rolls with respect to the reamers cooperating therewith to adapt the machine for handling fruits of different thicknesses of skin.

Other and further objects and advantages of the present invention will become apparent from the following description and drawings, in which:

Fig. 1 is a front elevation of the machine of the present invention.

Fig. 2 is a plan view of Fig. 1.

Fig. 3 is a plan view of the machine, the feed mechanism and certain covers having been removed to expose portions of the interior mechanism of the machine.

Fig. 4 illustrates a cross section of the machine taken along lines 4—4 of Fig. 2.

Fig. 5 is a horizontal section of Fig. 4 taken along lines 5—5 thereof, certain parts being omitted.

Fig. 6 is a bottom view of the housing of the machine taken along lines 6—6 of Fig. 4 with the shaker screen structure removed to clearly illustrate the interior mechanism of the machine.

Fig. 7 is a detail view of one of the guide plates and its associated bracket for mounting the same within the housing of the machine.

Fig. 8 is a side elevation of a portion of Fig. 7 taken along lines 8—8 thereof.

Fig. 9 is a plan view of a modified construction of juice extracting mechanism.

Fig. 10 is an enlarged vertical section of a portion of the feed chute and the fruit centering mechanism associated therewith, taken along lines 10—10 of Fig. 2.

Fig. 11 is a detail view of the mechanism for adjusting the position of the feed rolls with respect to the reamers of the machine, taken along lines 11—11 of Fig. 5.

Fig. 12 is a detail view of the wiping elements associated with the cutting blades for removing the peel oil from the same, the view being taken along lines 12—12 of Fig. 4.

Fig. 13 is an enlarged longitudinal section through the fruit divider of the machine taken along lines 13—13 of Fig. 3.

Fig. 14 is an enlarged perspective view of a portion of the juice extracting mechanism, illustrating the divider and guide plates and their relationship with respect to the feed rolls and reamers of the machine.

Figs. 15 and 16 are sections taken along lines 15—15 of Fig. 4, showing one set of feed rolls and reamers and illustrating primarily the manner of feeding and positioning of the halves and quarters of the fruit with respect to the juice extracting mechanism during the operation of the machine.

Figs. 17 and 18 are views similar to views 15 and 16 illustrating the feeding and positioning of the sections of the fruit with respect to one set of feed rolls and reamers of the modified structure shown in Fig. 9.

Fig. 19 is a section through a portion of the juice extracting mechanism of the machine illustrating the feeding of a fruit half to the same.

Fig. 20 shows a portion of a circular cutting blade illustrating a modified construction thereof.

Referring now to the drawings and especially to Figs. 1 to 6 inclusive, I illustrates the frame structure of the machine, which consists of an outer housing 2 and an inner housing 3. The outer housing 2 consists of side walls 4 and 5 and end walls 6 and 7, while the inner housing structure comprises side walls 8 and 9 and end walls 10 and 11. The inner housing structure 3 is connected with the outer housing structure 2 by means of a top wall 12 and forms an integral structure therewith. The inner housing structure 3 is open at the top and bottom thereof (see Figs. 3 and 6) and the top wall 12 is provided with pockets 16, 17, 18 and 19 extending from the vicinity of the walls 4, 5, 6 and 7 of the outer housing in downwardly inclined directions toward the inner housing structure 3 and through the walls 8, 9, 10 and 11 thereof. The lower inner ends of the pockets 16, 17, 18 and 19 are provided with oil discharge pipes 21, 22, 23 and 24, respectively, for discharging peel oil which will accumulate within these pockets from the same.

Mounted upon the top wall 12 of the frame structure 1 of the machine are a plurality of electric motors 30, 31, 32, 33. The drive shafts 34, 35 and 36 of the motors 30, 31 and 32 are provided at one end thereof with drive pulleys 37, 38 and 39, respectively, for purposes as will be described later on. The motor 30 includes a speed reduction mechanism 40 and a driven shaft 41 upon which a circular blade 42 is mounted for rotation therewith by means of a clamping mechanism 43, while the free end of the driven shaft 41 carries a drive pulley 44 fixed thereto. The motor 32 is provided with a speed reduction drive 45 which includes a driven shaft 46 to which a circular cutting blade 47 is secured for rotation therewith by means of a clamping mechanism 48. Fixed to the free end of the driven shaft 46 is a drive pulley 49, as will be best seen from Fig. 3.

In a similar manner motors 31 and 33 are provided with speed reduction mechanisms 50 and 51 and driven shafts 52 and 53, respectively. Fixed upon shaft 52 of the motor 31 is a circular cutting blade 54 by means of a clamping mechanism 55, while a circular blade 56 is fixed upon the driven shaft 53 of the motor 33 by means of a clamping mechanism 57. The circular cutting blades 42, 47, 54 and 56 are provided with sharp cutting edges at their peripheries and are so arranged with respect to the top wall 12 of the housing of the machine that they partially extend into the pockets 16, 17, 18 and 19, respectively.

The circular cutting blades or discs above referred to are positioned radially at right angles with respect to each other in such a manner that the opposing blades 42 and 47 are spaced from each other and the opposing blades 54 and 56 are as closely arranged with respect to each other as is possible without causing contact between the cutting edges of the same.

Secured to the upper wall 12 of the frame structure of the machine is a cover structure 65 which encloses the cutting blade portions extending above the top wall 12 of the machine and carries a tubular feed chute 66 which is integral therewith. This feed chute extends from the cover structure 65 in an upward direction in properly centered position with respect to the opposing cutting edges of the cutting blades 42, 47, 54 and 56.

The tubular feed chute 66, a detail of which is shown in Fig. 10, is provided with a ring structure 70 comprising a plurality of bearings 71 within which shafts 72, 73, 74 and 75 are rotatably mounted. These shafts are rotatably interconnected by means of cooperating gear segments 76 and 77 so that the rotation of one shaft causes a corresponding rotation of the remaining shafts, as will be best seen from Fig. 2. Fixed upon the shafts 72—75 are centering fingers 78 which extend through openings 79 in the side wall of the chute (see Fig. 10). These centering fingers extend from the openings 79 in downwardly inclined directions into proximity of the cutting blades forming a funnel-shaped throat for centering the fruits supplied to the machine through the feed chute 66 with respect to the opposing cutting edges of the cutting blades 42, 47, 54 and 56. Fixed to the free end of the shaft 75 is an arm 80 which carries a counterweight 81 adjustably secured thereto. This counterweight 81 functions to hold the centering fingers 78 in their innermost position in which the upper portions 82 of the same abut against the side wall of the feed chute 66, as shown in Fig. 10.

The fruits to be handled by the machine of the present invention are supplied in any convenient manner to the feed chute 66 and travel downwardly within the same in a single file toward the cutting blades 42, 47, 54 and 56, where they are cut in a manner as will be described hereinafter.

During the downward travel of the fruits within the feed chute 66 the fruits drop into the funnel-shaped throat formed by the centering members 78 and are automatically centered thereby with respect to the opposing cutting edges of the circular blades therebeneath. Due to the weight of the fruits acting upon the centering fingers 78 the latter are forced in an outward direction away from each other and permit the passage of the fruit downwardly therebetween. Thereupon the centered fruits fall upon the rapidly rotating cutting blades and are cut into halves by the cooperating blades 54 and 56 and at the same time these halves are cut into quarters by the blades 42 and 47. Due to the fact that the cutting blades 54 and 56 are practically in contact with their cutting edges the fruits will be completely cut into halves thereby. The blades 42 and 47 which cut the fruit halves into quarters do not completely cut through the entire halves of the fruit but leave a small portion of each half near the center of the fruit uncut so that the quarters of each half of the fruit will not be completely separated during the cutting operation of the cutting blades.

It should further be observed that the cutting blades 42, 47, 54 and 56 are so positioned with respect to each other that their opposed cutting edges contact a medium sized fruit placed upon the same. To effect this simultaneous contact of all blades with the fruits, the shafts 41 and 46 are mounted slightly higher above the top wall 12 than the shafts 52 and 53, so that the otherwise lower position of the cutting edges of the blades 42 and 47 in the region of their initial contact with the fruit (which is caused by the spacing of the blades 42 and 47) as compared with the position of the cutting edges of the circular blades 54 and 56 in this region is corrected.

Due to the fact that the circular blades are rotated in such a manner that the cutting edges thereof travel in inward and downward directions in the region of their initial contact with the fruits an additional centering of the fruits with respect to the blades is effected.

Positioned below the feed chute 66 and the cutting blades 42, 47, 54 and 56 and supported between plates 90 and 91 attached to brackets 92 and 93 carried by the inner housing 3 is a fruit-dividing member 94 of wedge-like configuration (see Figs. 3, 4 and 14) which is adapted to separate the halves of the cut fruit and to guide the same away from each other toward the juice extracting mechanism 95. The fruit dividing member 94 comprises fruit engaging surfaces 96 and 97 which are slightly curved as shown in Fig. 14 and provided with a plurality of grooves 98 to reduce the surface contact of the fruit therewith to a minimum to prevent sticking of the halves of the fruit on the guide surfaces 96 and 97 during their travel along the same.

The upper central portion 100 of the fruit dividing member 94 terminates into a sharp edge to facilitate the separation of the halves of the fruit during their downward travel past the same. The upper side portions of the fruit dividing member 94 are slotted as shown at 101 and 102 and adapted to receive portions of the blades 54 and 56, respectively, therein to permit a close positioning of the same with respect to each other as referred to in the above.

Fixed to the dividing member 94 and extending into the slots 101 and 102 are drain pipes 103 and 104 which are slotted as shown at 105 and 106, respectively, to permit entry of the blades 54 and 56 into the same. The free ends of the drain pipes 103 and 104 lead into the pockets 18 and 19, respectively, for discharging peel oil dropping from the cutting blades 54 and 56 into said pockets, from which the oil is in turn discharged by means of pipes 23 and 24 previously referred to.

Positioned adjacent the guide surfaces 96 and 97 of the fruit dividing member 94 are guide plates 120 and 121. These guide plates are arranged below the cutting blades 42 and 47, respectively, in accurate alignment therewith. The guide plate 120 (see Figs. 4, 7 and 8) is mounted within a slot 122 of the bracket 92 in any convenient manner, while the guide plate 121 is secured within a slot 123 of the bracket 93. Both guide plates 120 and 121 are of curved configuration (see Figs. 4 and 13), are closely spaced with respect to the cutting blades 42 and 47, and are spaced from the guide surfaces 96 and 97 of the fruit dividing member 94 a sufficient distance so as not to interfere with the uncut portions of the halves of the fruit left by the incomplete cutting action of the blades 42 and 47. The upper ends of the guide plates 120 and 121 are pointed and extend toward the point of contiguity of the cutting blades 42 and 47 (see Fig. 4).

Rotatably mounted adjacent each side of the guide plate 120 by means of a shaft 124 are feed rolls 125 and 126. These feed rolls, held in spaced relationship with respect to each other by means of a spacer 124a, are fixed upon the shaft 124 for rotation therewith and are each provided with a curved annular face 127 (see Fig. 5) having transverse ribs 127a. Keyed upon the shaft 124 which is rotatably mounted within bearings 128 and 129 supported by the end walls 10 and 11, respectively, is a drive pulley 130 which is operatively interconnected with the drive pulley 44 by means of a belt 131 so that upon operation of the motor 30 and rotation of the shaft 41 the feed rolls 125 and 126 are rotated in a direction as indicated in Fig. 4. The shaft 124 and spacer 124a extend through an opening 92a in the bracket 92 (see Fig. 7).

Positioned adjacent the feed rolls 125 and 126 and keyed upon a shaft 132 are reamers 133 and 134. These reamers are of curved configurations corresponding to the annular curved faces 127 of the feed rolls and are positioned adjacent each other with a circular cutting blade 135, which extends into the space between the feed rolls 125 and 126, interpositioned between the same. The shaft 132 extends through the plates 90 and 91 and the end walls 10 and 11 of the inner housing 3 and is rotatably mounted within bearings 136 and 137 (see Figs. 5 and 6). Fixed upon the free end of the shaft 132 exterior of the housing 2 is a drive pulley 138 which is rotatably interconnected by means of a drive belt 139 with the pulley 37 fixed to the motor shaft 34, so that upon operation of the motor 30 and rotation of the shaft 34 the reamers 133 and 134 will be rotated in the direction as indicated in Fig. 4. The pulleys 34, 138 and drive belt 139 are enclosed within a removable cover 140 adjacent the housing 2 of the machine.

Fixed to a shaft 147 rotatably mounted within bearings 145 and 146 are feed rolls 148 and 149. These feed rolls are spaced with respect to each other by a spacer 150 intermediate the same (see Fig. 5). The spacer 150 is positioned within an opening 151 of the bracket 93 through which shaft 147 extends. Keyed to the shaft 147 is further a drive pulley 152, and trained around the same and drive pulley 49 is a drive belt 153, so that upon operation of the motor 32 and rotation of shaft 46 the feed rolls 148 and 149 are rotated in a direction as indicated in Fig. 4. The annular faces 154 of the feed rolls 148 and 149 are curved and provided with transverse ribs 154a in a manner similar to feed rolls 125 and 126.

Mounted adjacent the feed rolls 148 and 149 and closely spaced therefrom are reamers 155 and 156 which are fixed upon a shaft 157 rotatably mounted within bearings 158 and 159 (see Figs. 5 and 6). The reamers 155 and 156 are of curved configurations corresponding to the curved faces of the feed rolls 148 and 149, respectively. Positioned intermediate the reamers 155 and 156, and fixed to shaft 157 is a circular cutting blade 160 which extends slightly into the space between feed rolls 148 and 149. Keyed to shaft 157 is further a drive pulley 162 which is rotatably interconnected with the drive pulley 39 of the motor shaft 36 by means of a drive belt 163, so that upon operation of the motor 32 the reamers 155 and 156 will be rotated in a direction as indicated by an arrow in Fig. 4. The pulleys 39, 162 and drive belt 163 are preferably enclosed by means of a removable cover 164.

The bearings 128 and 129 of the shaft 124 previously referred to are rotatably mounted within the walls 10 and 11 of the inner housing structure 3 by means of circular bearing flanges 165 and 166, respectively. These circular bearing flanges are integral parts of the bearings 128 and 129 and are eccentric with respect to the same, so that upon rotation of the bearings 128 and 129 in one or the other direction the shaft 124 and the feed rolls 125 and 126 will be shifted toward or away from the reamers 133 and 134. This adjustment affords a correct spacing of the feed rolls 125 and 126 with respect to the reamers 133 and 134 in accordance with the thickness of the skin of the fruits to be handled by the machine.

Positioned within the housing 2 of the machine and fixed with its free ends to the bearings 128 and 129 is a yoke 168 (see Fig. 5) provided with a handle 169 extending through a vertical slot 170 in the side wall 4 of the housing 2. The handle 169 consists of a knob 171, a rod 172, which is slidably mounted within the yoke structure 168, and a lock pin 173 adapted to engage notches 174 on the side wall 4 of the housing 2. A spring 175 interposed between the yoke 168 and a pin 176 at the free end of the rod 172 is adapted to normally maintain the lock pin 173 in engagement with one of the notches 174 to thereby hold the yoke 68 and the bearings 128 and 129 in any desired position of adjustment.

From the above it will therefore be seen that if it is desired to vary the spacing between the reamers 133, 134 and feed rolls 126 and 127, the handle 169 is pulled in an outward direction against the compression of the spring 175 to disengage the lock pin 173 from the notches 174 and is thereupon moved in an upward or downward direction until the desired spacing between the reamers and feed rolls is obtained, whereupon the handle 169 is released and automatically locked in adjusted position by means of the lock pin 173, notches 174 and spring 175.

The bearings 145 and 146, within which the shaft 147 is rotatably received, are rotatably mounted by means of circular bearing flanges 180 and 181 within the end walls 10 and 11 of the inner housing structure 3. These circular bearing flanges are eccentric with respect to the bearings 145 and 146, i. e., of the same construction as the bearing flanges 165 and 166 of bearings 128 and 129 previously described herein, so that upon rotation of the bearings 145 and 146 in one or the other direction the shaft 147 and feed rolls 148 and 149 are moved toward or away from the reamers 155 and 156 to thereby adjust the spacing of the feed rolls 148 and 149 with respect to the same.

Fixed to the bearings 145 and 146 is a yoke structure 182 which includes an operating handle 183 extending through a vertical slot 184 in the side wall 5 of the housing 2 of the machine. The yoke 182 and control handle 183 are of the same construction as yoke 168 and handle 169 previously described herein, so that a detailed description of this yoke structure and the operation thereof is not deemed necessary. It will therefore be sufficient to state that upon upward or downward movement of the control handle 183 the bearings 145 and 146 and their circular bearing flanges 180 and 181, respectively, are rotated in one or the other direction, so that any desired spacing between the feed rolls 148, 149 and reamers 155, 156 may be obtained.

It will therefore be seen that after the fruits have been cut into halves and the fruit halves have been divided into quarters in a manner as above stated, the cut portions of the fruit are advanced in a downward direction, due to their frictional engagement with the cutting blades, toward the divider 94. This divider separates the halves of the fruits, which thereupon slide along the curved guide surfaces 96 and 97 of the same (see Fig. 4) in a downwardly-inclined direction toward the juice extracting mechanism 95.

During the travel of the fruit portions along the guide surfaces 96 and 97 the guide plates 120 and 121 enter into the slots cut into the fruit by the blades 42 and 47 and guide the fruit halves so as to maintain them in proper positions and prevent turning of the same during their travel toward the juice extracting mechanism 95.

In other words, the guide plate 121 (see Figs. 15 and 19) enters into the slot cut into the fruit half travelling past the same and holds this half portion of the fruit in such a position that the slot which partially divides the fruit half into two quarters is maintained in alignment with the circular cutting blade 160 interposed between the reamers 155 and 156. The uncut portion 185 of this half section of the fruit is received within the space 186 between the guide plate 121 and divider 94 and is left intact during the downward movement of the halves of the fruit, as illustrated in Fig. 19, so that the quarter sections of the fruit will be held together until they enter into the spaces between the reamers 155, 156 and feed rolls 148, 149.

The reamers 133, 134 and 155, 156 are rotated in the directions as indicated by arrows in Fig. 4 at a high speed, preferably at 1800 R. P. M. while the feed rolls 125, 126 and 148, 149 are rotated in the directions as indicated by arrows in Fig. 4 at a slower speed, preferably at 125 R. P. M.

It will further be seen that upon travel of the half of the fruit designated 187 in Figs. 15 and 19 toward the feed rolls 148, 149 and reamers 155, 156 which rotate in opposite directions, the blade 160, which is rotated with the reamers 155, 156, cuts into the uncut portion 185 of this half section of the fruit and completes the division thereof into two quarters which are subsequently gripped by the reamers and feed rolls and pulled into the spaces or throats formed therebetween.

It should be noted, however, that the reamer blade 160 usually does not entirely cut through the full length of the uncut portion 185 of the fruit half 187 but merely cuts through the lower portion of the same while the upper uncut portion 185 will automatically be torn apart as soon as the lower parts of each quarter portion of the fruit are received between the curved annular opposed faces of the reamers 155, 156 and feed rolls 148 and 149, which turn the quarters of the fruit into positions as shown in Fig. 16, and completely separate the same from each other.

Thereupon the quarters of the fruit are forced downwardly between the reamers and feed rolls due to the frictional engagement therewith. In view of the difference in the speed of rotation of the reamers and feed rolls, the pulp and juice are extracted from each quarter section of the fruit without damaging or bruising the skin or rind portions thereof.

The rind portions of the quarters of the fruit are somewhat flattened and bent while they travel in a downward direction between the reamers and the feed rolls, so that a complete removal of the pulp and juice is obtained. Upon completion of the juice extracting operation of each quarter of the fruit, as above described, the skin portions are discharged from the juice extracting mechanism and are removed from the machine in a manner as will be described later on.

The fruit halves which are advanced to the reamers 133, 134 and feed rolls 125, 126 of the machine at the other side of the divider 94 are cut into quarters and are guided and reamed in the same manner as the fruit halves 187, so that a description of the operation of the guide plate 120, reamers 133, 134, circular blade 135 and feed rolls 125, 126 is not deemed necessary.

The juice removed from the quarters of the fruit by the juice extracting mechanism is directed through a shaker screen 200 and collected within a pan 201 secured to the frame of the machine. The shaker screen is of a chute-like construction (see Figs. 4 and 5) preferably made from stainless steel and comprises a bottom 202, side walls 203, 204 and a rear wall 205. The front end of the shaker screen structure is open as shown at 206 in Figs. 1 and 5. The shaker screen structure is further divided into a center portion 207 and skin chutes 208 and 209 by means of partitions 210 and 211.

The bottom of the skin chute portions 208 and 209 is made from solid material, while the bottom of the center portion 207 is perforated as shown at 212. A vertical partition 213 secured to the center of the screen portion 207 reduces the splashing of the juice from one side of the screen structure to the other and over the side walls thereof.

The partitions 210 and 211 extend longitudinally over the entire length of the shaker screen and carry skin deflector chutes 220 and 221 made from spaced parallel wires or rods in any convenient manner. These skin deflector chutes are curved in an inward and upward direction and extend into the vicinity of the reamers 133, 134 and 155, 156 adjacent the feed rolls 125, 126 and 148, 149 from which they are spaced a sufficient distance to permit unrestricted passage of the skins from the juice extracting mechanism into the skin chutes 208 and 209.

The shaker screen structure 200 is movably supported by means of flexible wooden springs 225 secured to the side walls 203 and 204 by means of brackets 226. The upper ends of the wooden springs 225 are secured to the lower side of the top wall 12 of the housing 2 by means of brackets 227.

Rotatably mounted within bearings 230 and 231 of the housing 2 is a crank shaft 232 to which a combined pulley and fly wheel 233 is fixed. A drive belt 234 trained around the pulley 233 and pulley 38 is adapted to cause rotation of the crank shaft 232 upon operation of the motor 31. A pitman made of a flexible wooden slat 235 is pivotally secured at one of its ends to the crank portion 236 of the crank shaft 232, while the other end of the pitman 235 is fixed to the rear end of the shaker screen 200 at 238 in any convenient manner. The pulleys 38, 233 and drive belt 234 are preferably enclosed by means of a cover 239 (see Fig. 1).

Upon rotation of the crank shaft 232 the shaker screen structure 200 will be reciprocated in directions parallel to the side walls 4 and 5 of the housing 2 so that the skin portions discharged into the skin chutes 208 and 209 will be discharged therefrom at the front end of the machine. All pits and coarse meat portions of the fruits which are directed with the juice and pulp of the fruits upon the perforated bottom 212 of the shaker screen are separated from the juice and are discharged at the front end of the screen. The skins as well as the pits and any coarse particles of the fruit are discharged from the shaker screen into separate receptacles, not shown. The juice passing through the screen is collected within the pan 201 and discharged therefrom by means of a pipe 240 in any convenient manner (see Fig. 4).

From the above it will therefore be seen that immediately after the extraction of the juice from the quarter sections of the fruits the skin portions thereof are discharged into the skin chutes 208 and 209 and are held out of contact with the juice removed from subsequent fruits handled by the machine, so that there is no possibility that any peel oil adhering to the outer surface of the skin portions is washed off and co-mingled with the juice and discharged into the pan 201.

It has been stated hereinbefore that the peel oil extracted from the skins of the fruit during the cutting action of the rotary blades 42, 47, 54 and 56, which adheres to the blades, is discharged into the pockets 16, 17, 18 and 19 and delivered through pipes 21, 22, 23 and 24 from the machine. To obtain an efficient removal of the peel oil from the circular blades referred to rubber wipers 245 secured to the brackets 92 and 93 and the side walls of the pockets 18 and 19, respectively, may be provided. These rubber wipers may be of any conventional construction, as shown in Figs. 4 and 12, and are preferably positioned in such a manner that the peel oil removed thereby is discharged into the peel oil pockets above referred to, which collect the same.

The reamers 133, 134 and 155, 156 referred to herein are preferably made from stainless aluminum alloy in the form of a segment of a cask, and the annular faces of the feed rolls 125, 126 and 148, 149 are curved in such a manner that its curvature will conform to the curvature of the reamers above referred to. The feed rolls may be preferably made from rubber or any similar material, so as to prevent damage of the outer surface of the skins to reduce the expression of the peel oil thereof as much as possible.

When the reamers are constructed in such a manner any rubbing of the same against the skin portions of the halves of the fruits at points 250 and 251, when the fruit halves are in a position as shown in Fig. 15, is prevented and this reduces materially the peel oil content in the juice.

In Fig. 9, a modified reamer and feed roll construction has been disclosed wherein the reamers 133a, 134a and 155a, 156a are barrel shaped and the feed rolls 125a, 126a, and 148a, 149a are each provided with an annular groove 251a and transverse ribs 252. The curvature of the grooves and ribs of the feed rolls corresponds to the curvature of the barrel shaped reamers. The operation of this feed roll and reamer construction is substantially the same as described in regard to Figs. 15 and 16 with the exception, however, that when the fruit halves are admitted to the juice extracting mechanism the skin portions 260 and 261 thereof (see Fig. 17) will be contacted by the reamers 155a and 156a, causing a removal of a slight amount of peel oil from the skins. This is also true in regard to the operation of the reamers 133a and 134a, as will be obvious to those skilled in the art.

When the reamer and feed roll structures, as disclosed in Figs. 9, 17 and 18, are employed, the quarters of the fruit will position themselves in a slightly different angle with respect to each other (see Fig. 18) as is the case in the construction shown in Fig. 16. However, no disadvantages are caused thereby.

In the operation of the machine now to be described, the fruits are continuously supplied in a single file to the feed chute 66 and drop in a vertical direction within the same upon the centering fingers 78 which are normally held in their innermost position by the action of the counterweight 81. These centering fingers form a converging funnel or throat so that the fruits received thereby are guided into centered position with respect to the opposing cutting edges of the circular cutting blades 42, 47, 54 and 56 positioned therebeneath. Due to the weight of each fruit acting upon the centering fingers 78 the same are spread apart equidistant from the vertical axis of the feed chute 66 and guide each fruit passing therethrough in a properly centered position to the cutting blades which are rotated at a high speed. Each fruit received upon the cutting blades is completely cut into two halves, i. e., into segments including an angle of 180°, by the cutting blades 54 and 56. At the same time the halves of the fruit are partially divided into quarter sections, i. e., segments including an angle of 90 degrees, by the cutting blades 42 and 47 while all of the cut fruit portoins or segments are advanced polarwise in a downward direction by the frictional engagement with the blades.

The portions of each fruit passing in this manner through the cutting mechanism of the machine are presented to the divider 94 and guide plates 120 and 121. The divider 94 separates the halves of the fruit which thereupon slide along the guide surfaces 96 and 97 in a downward direction toward the juice extracting mechanism of the machine. The portions of each succeeding fruit force the portions of each preceding fruit in a downward direction through the machine and into proper gripping contact with the juice extracting mechanism 95.

Incidental to the separation of the halves of the fruit by the divider 94 the guide plates 120 and 121 enter into the slots cut by the blades 42 and 47 in each half of the fruit so that a proper guiding of these fruit sections toward the juice extracting mechanism is assured. The uncut portion near the center of each half of the fruit between adjacent quarter sections remains intact during the downward feeding of the fruit halves and travels within the passages 186 and 186a formed between the guide plates 120, 121 and the divider 94 (see Fig. 19). Immediately preceding the entry of the lower portions of the fruit halves into the throats between the reamers 133, 134 and feed rolls 125, 126, as well as reamers 155, 156 and feed rolls 148, 149, the lower uncut skin portions and center portions of the fruit halves between the quarter sections thereof are cut and separated by the reamer blades 135 and 160 and are gripped by the reamers and feed rolls and pulled downwardly between the same.

As soon as the lower separated ends of the quarter sections of the fruit halves are gripped by the reamers and feed rolls as above described, the quarter sections, into which the fruit halves have been previously but incompletely divided, automatically position themselves with their curved skin portions in substantial alignment with the curved throats between the reamers and the cooperating feed rolls. In other words, the incompletely separated quarters of the fruit are turned by the gripping action of the reamers and feed rolls and positioned with their skin portions substantially parallel to the curved faces of cooperating reamers and feed rolls. During this turning of the quarter sections of the fruit the upper uncut meat and skin portions between adjacent quarter sections of the halves of the fruit are completely broken apart and separated into individual quarter sections which are pulled downwardly between the reamers and feed rolls so that the rapidly rotating reamers scoop out the pulp and juice and effectively remove the same from the skin portions of the fruit.

The removed juice and pulp squirt in a downward direction against the splash guard 213 and the perforated bottom 212 of the shaker screen and drain through the same into the pan 201 where the juice is collected and from which the same is discharged by means of the discharge pipe 240. The shaker screen 200 is continuously reciprocated during the operation of the machine, and any pits or coarse fragments of fruit or skin falling upon the perforated bottom 212 thereof are separated from the juice directed thereto and are discharged from the machine at the front end of the shaker screen.

The denuded skin portions of the fruits fall upon the skin deflector chutes 220 and 221 as soon as they are released by the reamers and feed rolls of the machine. These deflector chutes direct the skin portions into the skin chutes 208 and 209 from which they are discharged at the front end of the shaker screen. The rotating feed rolls shift the skins in a downward direction and prevent a clogging of the same within the skin deflector chutes 220 and 221.

The peel oil removed from the fruits during the cutting of the same which adheres to the blades 42, 47, 54 and 56 is removed therefrom by means of the rubber wipers 245, collected in the pockets 16, 17, 18 and 19, and discharged from the machine through the pipes 21 to 24.

It is important that the feed rolls are properly spaced with respect to the reamers so as to completely remove the juice and pulp from the sections of the fruit and the same have therefore to be carefully adjusted relative to each other before the operation of the machine in conformity with the thickness of the skin of the fruit to be handled thereby. The adjustment of the feed rolls with respect to the reamers is effected by moving the handles 169 and 183 in upward or downward directions and should be such that the feed rolls and reamers properly grip the skins of the fruit and advance the same downwardly therebetween without squeezing or rupturing the oil cells of the skin so as to prevent the expression of peel oil from the same.

In view of the action of the centering fingers, which position each fruit in proper centered position with respect to the opposing cutting edges of the blades irrespective of the size of the fruit, a sizing of the fruits to be handled by the machine is not necessary.

The shaker screen structure 200 and the circular blades are preferably made from stainless steel while the housing structure and other metal parts of the machine which come into contact with the juice are preferably made from corrosion-resisting aluminum alloy.

If desired the circular cutting blades or discs 42, 47, 54 and 56 may be notched at their peripheries in a manner as illustrated at 270 in Fig. 20 and provided with sharp cutting edges extending along the peripheral portions 271 and notched portions 272. These blades are installed in the machine in such a manner that the notched portions of opposing cutting blades are off-set with respect to each other to insure a complete cutting of the fruit. This blade structure is especially adaptable for cutting withered fruit with a tough leather-like skin and effects a more positive feeding of the fruit from the feed chute 66 to the divider 94.

I desire it to be understood that the invention is not limited to the particular application or precise construction illustrated herein, but that various applications, modifications and variations may be made without departing from the spirit or scope of the invention, and I deem myself entitled to all such applications, modifications, and variations as come within the scope of the claims appended hereto.

Having thus described my invention, what I claim and desire to protect by Letters Patent is:

1. A fruit juice extracting machine comprising a plurality of rotary blades positioned at right angles with respect to each other for cutting the fruit into halves and for partially dividing the halves into quarters, means for feeding the fruit to the blades, juice extracting means below said blades for receiving the cut portions of the fruit therebetween and for extracting the juice therefrom, means for guiding the halves of the fruit polarwise to the juice extracting means, and means for completely dividing the halves of the fruit into quarters upon presentation thereof to the juice extracting means.

2. A fruit juice extracting machine comprising a plurality of rotary blades arranged in pairs disposed at right angles with respect to each other, means for feeding the fruit to the blades, each blade being provided with a peripheral cutting edge, the cutting edges of one pair of said blades being so positioned with respect to each other that the fruit received therebetween is completely cut into halves, the cutting edges of the other pair of blades being so positioned with respect to each other and said first-mentioned pair of blades that the fruit halves are partially divided into quarters, juice extracting means associated with the blades for receiving the cut portions of the fruit and removing the juice therefrom, means for guiding the partially divided halves of the fruit in predetermined positions to said juice extracting means, and means cooperating with the juice extracting means for completing the division of the halves of the fruit previous to their entry into the juice extracting means.

3. A fruit juice extracting machine comprising a plurality of rotary blades arranged in pairs disposed at right angles with respect to each other, means for feeding the fruit to the blades, each blade being provided with a peripheral cutting edge, the cutting edges of one pair of said blades being so positioned with respect to each other that the fruit received therebetween is completely cut into halves, the cutting edges of the other pair of blades being so positioned with respect to each other and said first-mentioned pair of blades that the fruit halves are partially divided into quarters, juice extracting means associated with the blades for receiving the cut portions of the fruit and removing the juice therefrom, means for guiding the partially divided halves of the fruit polarwise to said juice extracting means, and means cooperating with the juice extracting means for completing the division of the halves of the fruit previous to their entry into the juice extracting means.

4. A fruit juice extracting machine comprising radially arranged circular blades positioned at right angles with respect to each other for cutting the fruit into halves and for partially dividing the halves into quarters, means for feeding the fruit to the blades, juice extracting means, means for guiding the partially divided halves to the juice extracting means, and means cooperating with the juice extracting means for completing the division of the halves of the fruit into quarters upon entry of the halves into the juice extracting means.

5. A fruit juice extracting machine comprising radially arranged circular blades positioned at right angles with respect to each other for cutting the fruit into halves and for partially dividing the halves into quarters, means for feeding the fruit to the blades, juice extracting means, means for guiding the partially divided halves polarwise to the juice extracting means, and means cooperating with the juice extracting means for completing the division of the halves of the fruit into quarters upon entry of the halves into the juice extracting means.

6. A fruit juice extracting machine comprising radially arranged circular blades provided with cutting edges at the peripheries thereof and positioned at right angles with respect to each other to form opposing sets of cooperating blades, means for feeding the fruit to the blades, the cutting edges of one set of opposing blades being closely positioned with respect to each other to cut the fruit received therebetween into halves, the cutting edges of the other set of blades being spaced from each other to partially divide the halves of the fruit into quarters, juice extracting means for receiving the cut sections of the fruit and for removing the juice from the same, means for guiding the partially divided halves of the fruit polarwise from the blades to said juice extracting means, and means for completing the division of the fruit halves into quarters incident to their entry into the juice extracting means.

7. A fruit juice extracting machine comprising radially arranged circular blades provided with cutting edges at the peripheries thereof and positioned at right angles with respect to each other to form opposing sets of cooperating blades, means for feeding the fruit to the blades, the cutting edges of said opposing sets of blades being positioned with respect to each other to cut the fruit received therebetween into halves and to partially divide the halves of the fruit into quarters, juice extracting means for receiving the cut sections of the fruit and for removing the juice from the same, means for guiding the partially divided halves of the fruit polarwise from the blades to said juice extracting means, and means cooperating with the juice extracting means for completing the division of the fruit halves into quarters incident to entry of the fruit halves into the juice extracting means.

8. A fruit juice extracting machine comprising a pair of rotary cutting blades for cutting the fruit into halves, a pair of rotary cutting blades for partially dividing the halves into quarters, means for feeding the fruit to the blades, juice extracting means associated with said blades for receiving the cut portions of the fruit and operable to extract the juice therefrom, means for guiding the partially divided halves of the fruit in predetermined positions to the juice extracting means, and means associated with the juice extracting means and cooperating therewith for completing the division of the fruit halves into quarters upon entry of the partially divided halves into the juice extracting means.

9. A fruit juice extracting machine comprising a pair of rotary cutting blades for cutting the fruit into halves, a pair of rotary cutting blades for partially dividing the halves into quarters, means for feeding the fruit to the blades, juice extracting means associated with said blades for receiving the cut portions of the fruit and operable to extract the juice therefrom, means for guiding the partially divided halves of the fruit polarwise to the juice extracting means, and rotary cutting means associated with the juice extracting means and cooperating therewith for completing the division of the fruit halves into quarters upon entry of the partially divided halves into the juice extracting means.

10. A fruit juice extracting machine comprising two pairs of opposing circular cutting blades provided with cutting edges at their peripheries and arranged at right angles with respect to each other, means for rotating the opposing blades of each pair thereof in opposite directions, means for feeding the fruit to the blades, said pairs of blades being positioned to cut the fruit received between opposing cutting edges thereof into halves and to partially divide the halves into quarter sections, means positioned below the blades for extracting the juice from the cut portions of the fruit, means intermediate said blades and juice extracting means for separating the cut halves of the fruit, and means for engaging the halves of the fruit between the partially divided quarter sections thereof, and for guiding the halves to the juice extracting means.

11. A fruit juice extracting machine comprising two pairs of opposing circular cutting blades provided with cutting edges at their peripheries and arranged at right angles with respect to each other, means for feeding the fruit to the blades, means for rotating the blades of each pair of blades in opposite directions, said pairs of blades being positioned to cut the fruit received between opposing cutting edges thereof into halves and to partially divide the halves into quarter sections, means positioned below the blades for extracting the juice from the cut portions of the fruit, means intermediate said blades and juice extracting means for separating the cut halves of the fruit, means for engaging the halves of the fruit between the partially divided quarter sections thereof and for guiding the halves to the juice extracting means, and means associated with the juice extracting means and cooperating therewith to effect completion of the division of the fruit halves into quarter sections upon entry of the same into the juice extracting means.

12. A fruit juice extracting machine comprising a plurality of radially arranged blades disposed at right angles with respect to each other, means for feeding the fruit to the blades, means for rotating said blades for cutting the fruit received thereby into segments, and juice extracting means for receiving said segments and for removing the juice therefrom, said blades being so arranged and operated with respect to the juice extracting means that the segments of the fruit are thereby propelled into the mouth of the juice extracting means.

13. A fruit juice extracting machine comprising a plurality of radially arranged blades disposed at right angles with respect to each other, means for feeding the fruit to the blades, means for rotating said blades for cutting the fruit into segments, juice extracting means for receiving said segments and for removing the juice therefrom, and means for mounting the blades in closely spaced relation with respect to the juice extracting means whereby the segments of the fruit are propelled by said blades into the mouth of the juice extracting means.

ALBERT R. THOMPSON.